United States Patent
Burton

(10) Patent No.: US 9,957,996 B2
(45) Date of Patent: May 1, 2018

(54) QUICK TURN FASTENER

(71) Applicant: Burton Technologies, LLC, Ludington, MI (US)

(72) Inventor: John Burton, Ludington, MI (US)

(73) Assignee: Burton Technologies, LLC, Ludington, MI (US)

(*) Notice: Subject to any disclaimer, the term of this patent is extended or adjusted under 35 U.S.C. 154(b) by 0 days. days.

(21) Appl. No.: 14/744,797

(22) Filed: Jun. 19, 2015

(65) Prior Publication Data
US 2015/0285289 A1    Oct. 8, 2015

Related U.S. Application Data

(63) Continuation of application No. 13/696,609, filed as application No. PCT/US2011/037761 on May 24, 2011, now Pat. No. 9,140,285.
(Continued)

(51) Int. Cl.

| F16B 19/00 | (2006.01) |
| F16B 33/00 | (2006.01) |
| F16B 21/02 | (2006.01) |
| F16B 37/08 | (2006.01) |
| F16B 13/02 | (2006.01) |
| F16B 37/04 | (2006.01) |

(Continued)

(52) U.S. Cl.
CPC ............ *F16B 33/006* (2013.01); *F16B 21/02* (2013.01); *F16B 37/085* (2013.01); *F16B 13/02* (2013.01); *F16B 37/042* (2013.01); *F16B 39/30* (2013.01); *F16B 39/32* (2013.01); *Y10T 29/49881* (2015.01); *Y10T 29/49963* (2015.01)

(58) Field of Classification Search
CPC ...... F16B 33/006; F16B 21/02; F16B 37/085; F16B 13/02; F16B 37/042; F16B 39/30; F16B 39/32; Y10T 29/49881; Y10T 29/49963
See application file for complete search history.

(56) References Cited

U.S. PATENT DOCUMENTS

| 1,158,454 A | 11/1915 | DeCamp |
| 4,014,245 A | 3/1977 | Frye et al. |

(Continued)

FOREIGN PATENT DOCUMENTS

| DE | 3148043 | 6/1983 |
| DE | 102006051599 | 5/2008 |

OTHER PUBLICATIONS

International Search Report for PCT/US2011/037761, dated Sep. 8, 2011.
European search report for 11787256.4 dated Oct. 2, 2014.

*Primary Examiner* — Jun Yoo
(74) *Attorney, Agent, or Firm* — Brian G. Gilpin; Godfrey & Kahn, S.C.

(57) ABSTRACT

A fastener for use in connection with a tubular boss has a shaft with at least one rib along the length thereof and at least one thread segment extending at least partially around the shaft. The shaft is inserted into the boss in first position, and rotated to a second position wherein the at least one thread segment engages at least one column formed in the tubular boss. The shaft can be integrally formed with a first molded part to be fastened to a second molded part with an integrally formed tubular boss. Various locking features for locking the shaft in the boss are also disclosed.

1 Claim, 17 Drawing Sheets

Related U.S. Application Data

(60) Provisional application No. 61/347,671, filed on May 24, 2010.

(51) Int. Cl.
  *F16B 39/30* (2006.01)
  *F16B 39/32* (2006.01)

(56) References Cited

U.S. PATENT DOCUMENTS

| | | |
|---|---|---|
| 4,472,095 A | 9/1984 | Molina |
| 4,989,911 A | 2/1991 | Van Order |
| 5,368,427 A | 11/1994 | Pfaffinger |
| 5,980,177 A * | 11/1999 | Schiess ............... F16B 39/025 411/299 |
| 6,119,306 A | 9/2000 | Antonucci et al. |
| 6,612,795 B2 | 9/2003 | Kirchen |
| 7,686,555 B1 | 3/2010 | Larson et al. |
| 8,533,919 B2 | 9/2013 | Schliessner |
| 8,908,039 B2 * | 12/2014 | De Wind ...................... 348/148 |
| 2002/0003993 A1 | 1/2002 | Ichimaru |
| 2004/0112873 A1* | 6/2004 | Ramasamy ............ B23K 9/207 219/98 |
| 2008/0044603 A1* | 2/2008 | Hutchinson ............. B29C 51/04 428/35.7 |
| 2008/0141613 A1 | 6/2008 | Houck et al. |
| 2009/0232617 A1 | 9/2009 | Sessa |

* cited by examiner

QUICK TURN FASTENER

CROSS-REFERENCE TO RELATED APPLICATION

This application claims the benefit of U.S. application Ser. No. 13/696,609, filed Nov. 7, 2012, now U.S. Pat. No. 9,140,285, issued on Sep. 22, 2015, which is the United States national stage filing of International Application Number PCT/US11/37761, filed May 24, 2011, which claims the benefit of and priority to U.S. Provisional Patent Application Ser. No. 61/347,671, filed on May 24, 2010, which is incorporated herein by reference for all purposes.

BACKGROUND OF THE INVENTION

The present invention relates generally to fasteners. In particular, the present invention relates to a quick turn fastener for use with a molded or extruded tubular boss.

The fastener of the present invention is particularly useful for attaching to a plastic molded or extruded part. Existing fasteners for use with plastic molded materials are generally intended for attachment to flat panels, and require a flat panel or a through-hole in order to work. Examples include existing quarter-turn, "Christmas tree" and snap-fit style fasteners. The existing fasteners work reasonably well for their intended applications, but are not practical for attachment to molded parts where no flat panel or through-hole is available.

A tubular boss is a very desirable attachment feature for injection molded parts. Metal screws are commonly used to directly fasten to the tubular boss, forming threads on the inside. Thread forming metal screws can provide a connection with a high resistance to pull out, but this may not be required by the design and it may be more important to have a tool-free or quick assembly without the need for screw-driving equipment or tools. Metal screws also have the potential to corrode, which can be very undesirable. Non-threaded tubular bosses are simple to injection mold or extrude. They allow the use of blind holes for an air tight barrier, and they offer substantial diameter to length support for bending strength and alignment of attached parts. Unfortunately, no good method exists for attaching a plastic fastener directly to a simple tubular boss using prior art fasteners. As a result, metal screws continue to be used due to a lack of alternatives, which allows corrosion and adds costs, complexity and assembly time.

Thread forming using plastic screws in place of metal has been attempted, since thread forming is possible if the male thread is made from a material that is higher strength than the tubular boss. One example is using a male screw made of 30% glass-filled nylon to thread form into a much softer polypropylene tubular boss. However, preventing stripped threads becomes more difficult due to generated heat that can soften the threads. There is also increased risk of vibration loosening, since maintaining screw clamp load is more problematic with plastic material used for both the screw thread and tubular boss. A fully threaded tubular boss does not do much to avoid these potential issues and 'unscrewing molds' add considerable cost and complexity to mold tool construction. Assembly time is still slow and requires tools, compared to snap fit and quarter-turn style fasteners used in flat panels. Cross threading, axial alignment to the tubular boss, and achieving a specific rotational position after assembly are all difficult to control.

A complete injection moldable fastening system is desirable, in which the fastener is incorporated directly into the injection molded product desired to be fastened, to speed assembly and eliminate screws. A few examples are wire guides, stand-offs and various stud designs but many other possibilities exist.

Accordingly, a need exists for an improved quick turn fastener and fastening method that solves these and other deficiencies in the prior art. Of course, the present invention is not limited to plastics, may be used in softer metals and a multitude of situations where similar performance capabilities are required.

SUMMARY OF THE INVENTION

The present invention provides a fastener and fastening method that is cost effective, provides improved functionality, and eliminates certain of the deficiencies inherent in existing designs.

In one embodiment of the present invention, a fastening assembly includes a shaft that mates with a tubular boss. The shaft has at least one rib along its length and at least one thread segment extending at least partially around the shaft from the at least one rib. The tubular boss has a cylindrical opening with at least one column disposed therein. The shaft is inserted into the tubular boss in a first position and rotated, preferably a quarter-turn, into a second position such that the thread segment engages the columns. Various locking features can be used to lock the shaft in the boss as needed for a particular application and function without the need for clamping force.

Another embodiment of the present invention is a fastener for use in connection with a molded tubular boss having a cylindrical opening and at least one column formed therein. The fastener includes a shaft configured for insertion into the tubular boss, at least one rib formed along the length of the shaft, and at least one thread segment extending at least partially around the shaft from the at least one rib. The shaft can be inserted into the boss in a first position and rotated to a second position such that the at least one threaded segment engages the at least one column. Preferably, engagement between the shaft and the boss is achieved via thread forming, wherein the shaft is formed from an injection molded plastic or die-cast metal material of higher strength than that of the tubular boss to allow the at least one thread segment to pierce the at least one column. Alternatively, the tubular boss could include internal thread segments formed within the cylindrical opening to engage the at least one threaded segment of the shaft.

A method for attaching a first molded part to a second molded part is also contemplated by the present invention. The method includes the steps of: providing a shaft in accordance with the present invention integrally formed on the first molded part; providing a tubular boss in accordance with the present invention integrally formed on the second molded part; inserting the shaft into the tubular boss in a first position; and rotating the shaft to a second position, wherein the at least one threaded segment engages the at least one column. The method can also include the step of locking the shaft in the rotated position.

Various embodiments of the present invention overcome many of the disadvantages associated with the prior art. Alignment to the boss may be maintained because the shaft can be fully inserted into the tubular boss before rotating. Cross-threading can be avoided, and concentric alignment is achieved. Rotational position can be controlled by the columns inside the tubular boss. No drive torque, strip torque or speed controls are needed because the product can be rotated to a dead stop when the columns meet the ribs and no significant heat results with the quarter-turn rotation. The locking features, when used, are independent of clamping force and material relaxation, which avoid vibration loosening. The assembly time is very fast, and no tools or screw-driving equipment are needed. All of these features of the present invention represent a significant improvement over prior art fasteners and fastening methods.

While certain possible applications and advantages of the present invention have been described herein, many other applications are possible and references to use in connection with a particular application should not be deemed to limit the uses of the present invention. The terms used herein should not be interpreted as being limited to specific forms, shapes, or compositions. Rather, the parts may have a wide variety of shapes and forms and may be composed of a wide variety of materials.

DETAILED DESCRIPTION OF THE PREFERRED EMBODIMENTS

Figure 4:
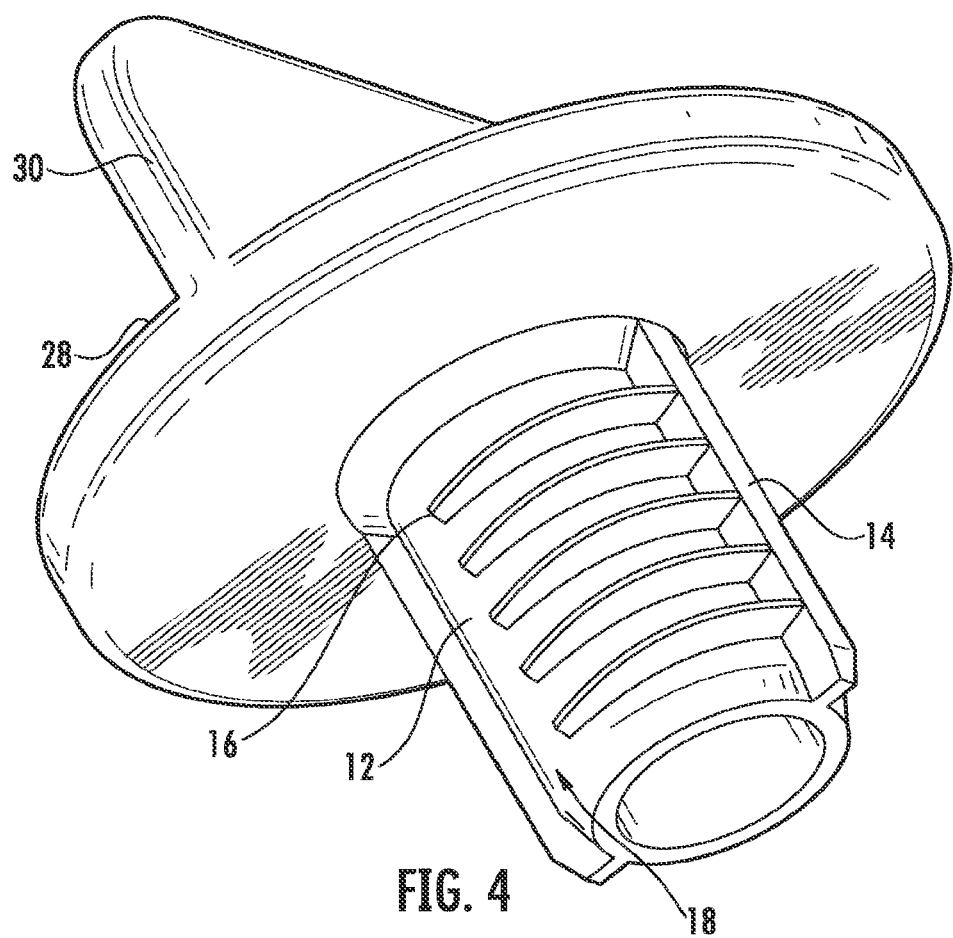
FIG. 4 is a perspective view of one embodiment of a fastener used in connection with the present invention.
Figure 5:
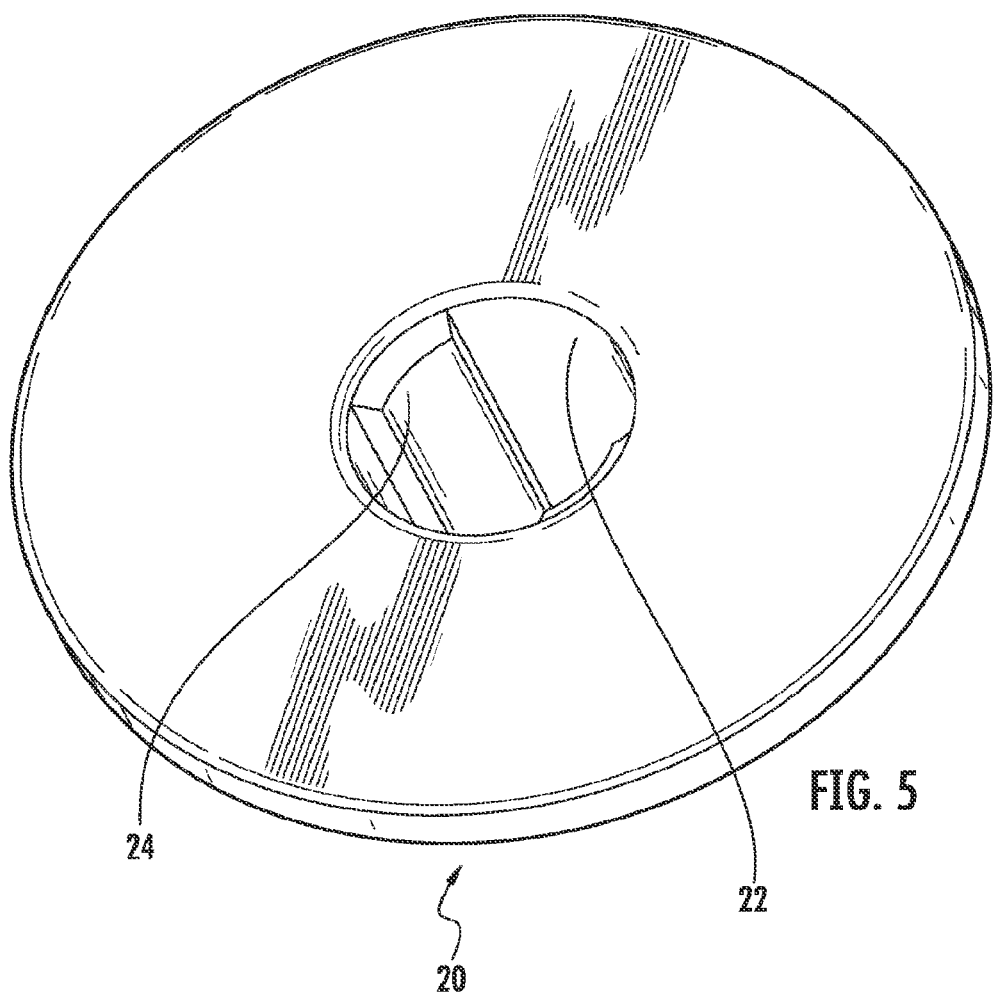
FIG. 5 is a perspective view of one embodiment of a tubular boss used in connection with the present invention.
Figure 6:
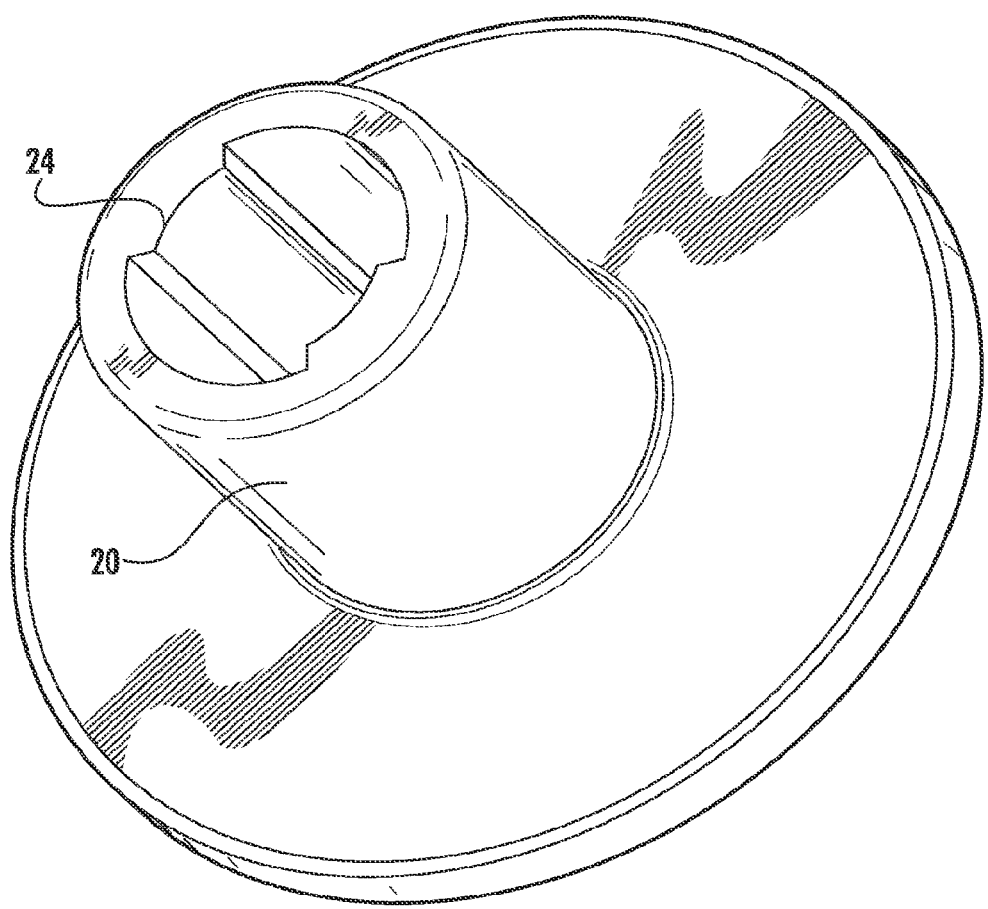
FIG. 6 is a perspective view of another embodiment of a tubular boss used in connection with the present invention.
Figure 8:
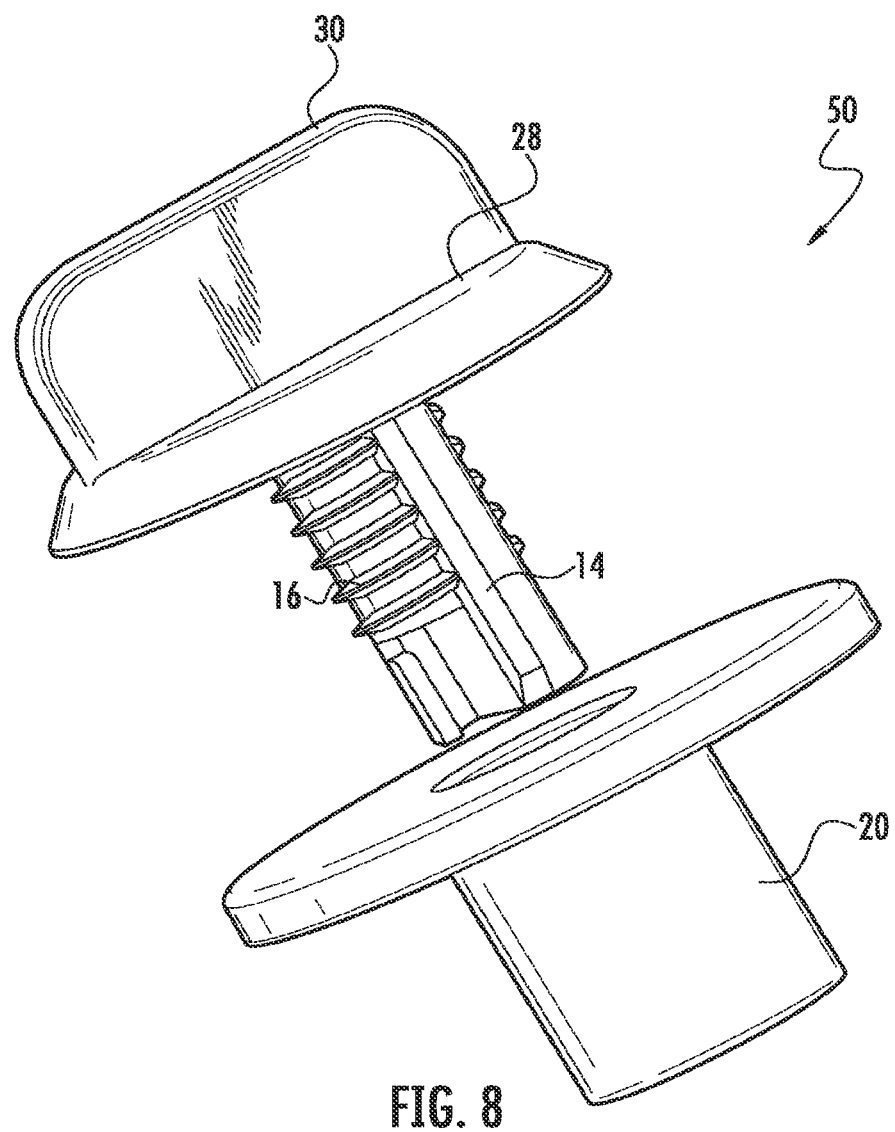
FIG. 8 is an exploded perspective view of another embodiment of a fastening assembly of the present invention.
Figure 9:
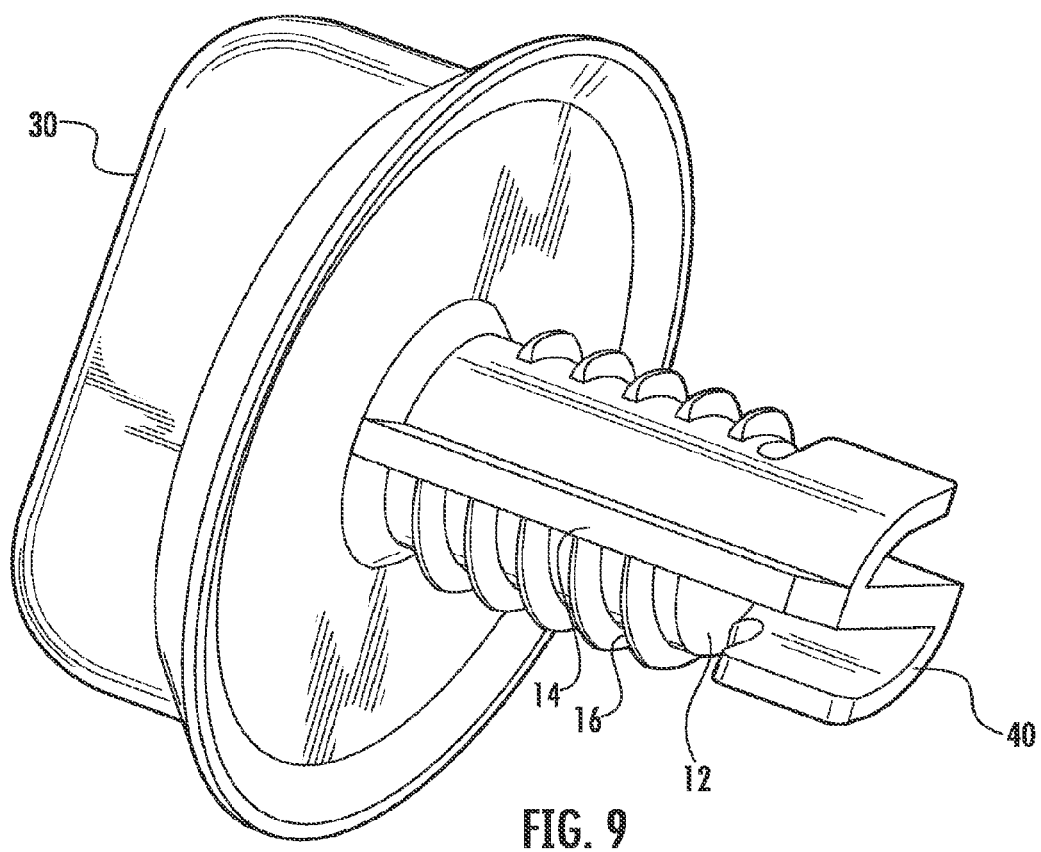
FIG. 9 is a perspective view of another embodiment of a fastener used in connection with the present invention.
Figure 10:
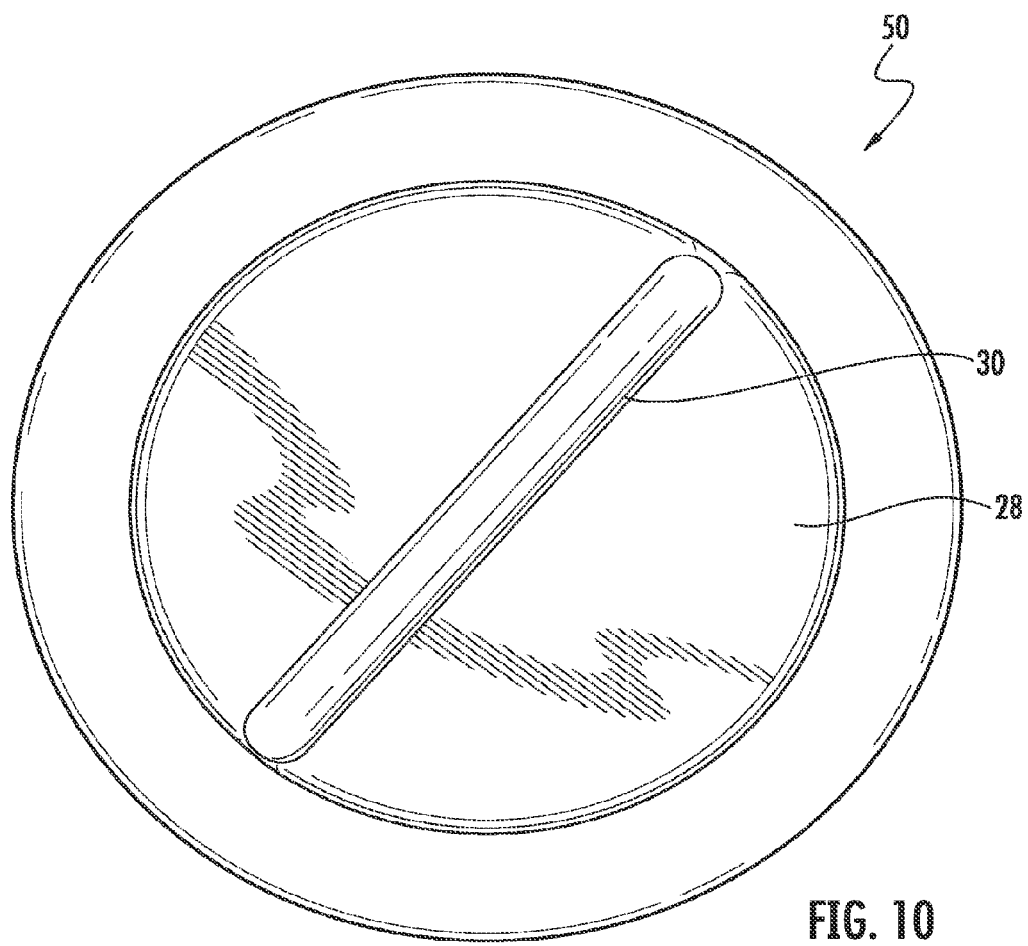
FIG. 10 is a top plan view of one embodiment of the fastening assembly of the present invention, showing the fastener turned in a first position.
Figure 11:
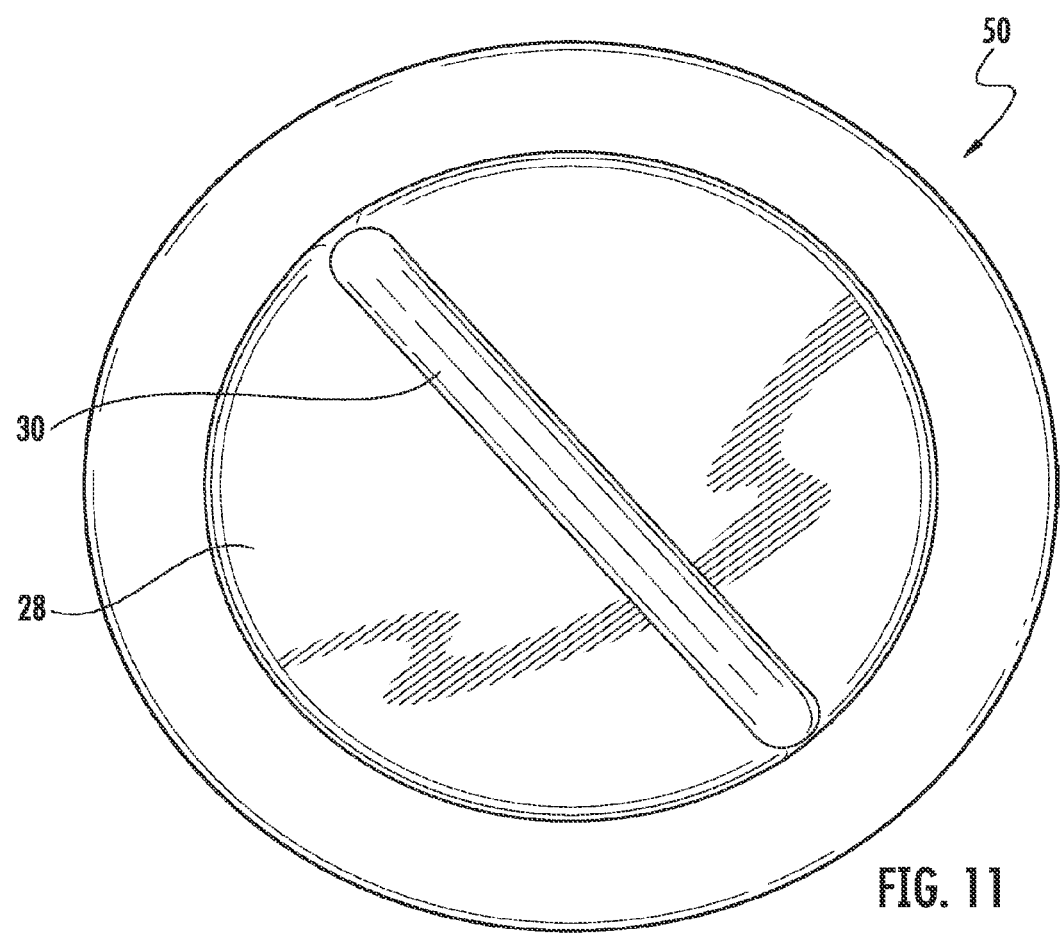
FIG. 11 is a top plan view of the fastening assembly of FIG. 10, showing the fastener turned in a second position.
Figure 12:
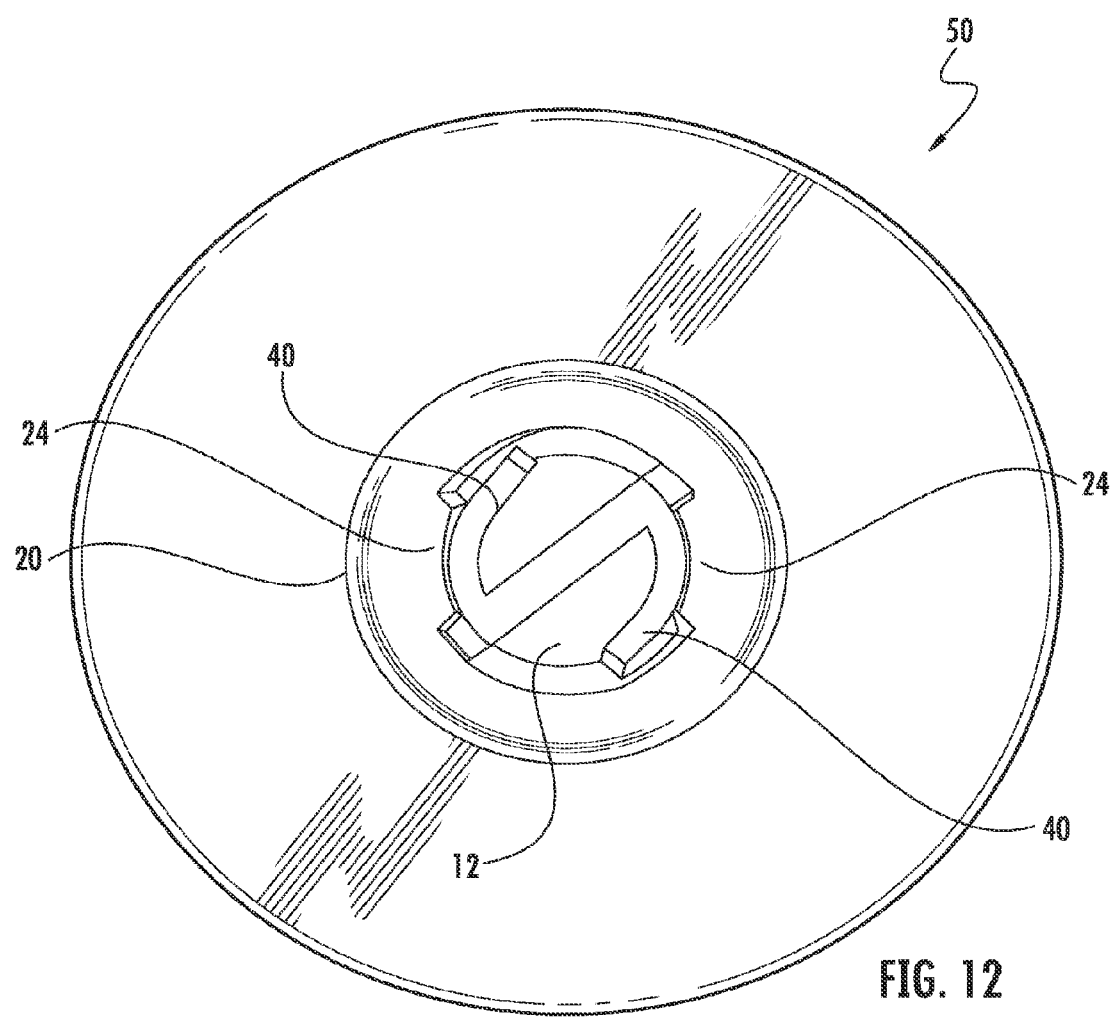
FIG. 12 is a bottom plan view of the fastening assembly of FIG. 10, showing the fastener turned in the first position.
Figure 13:
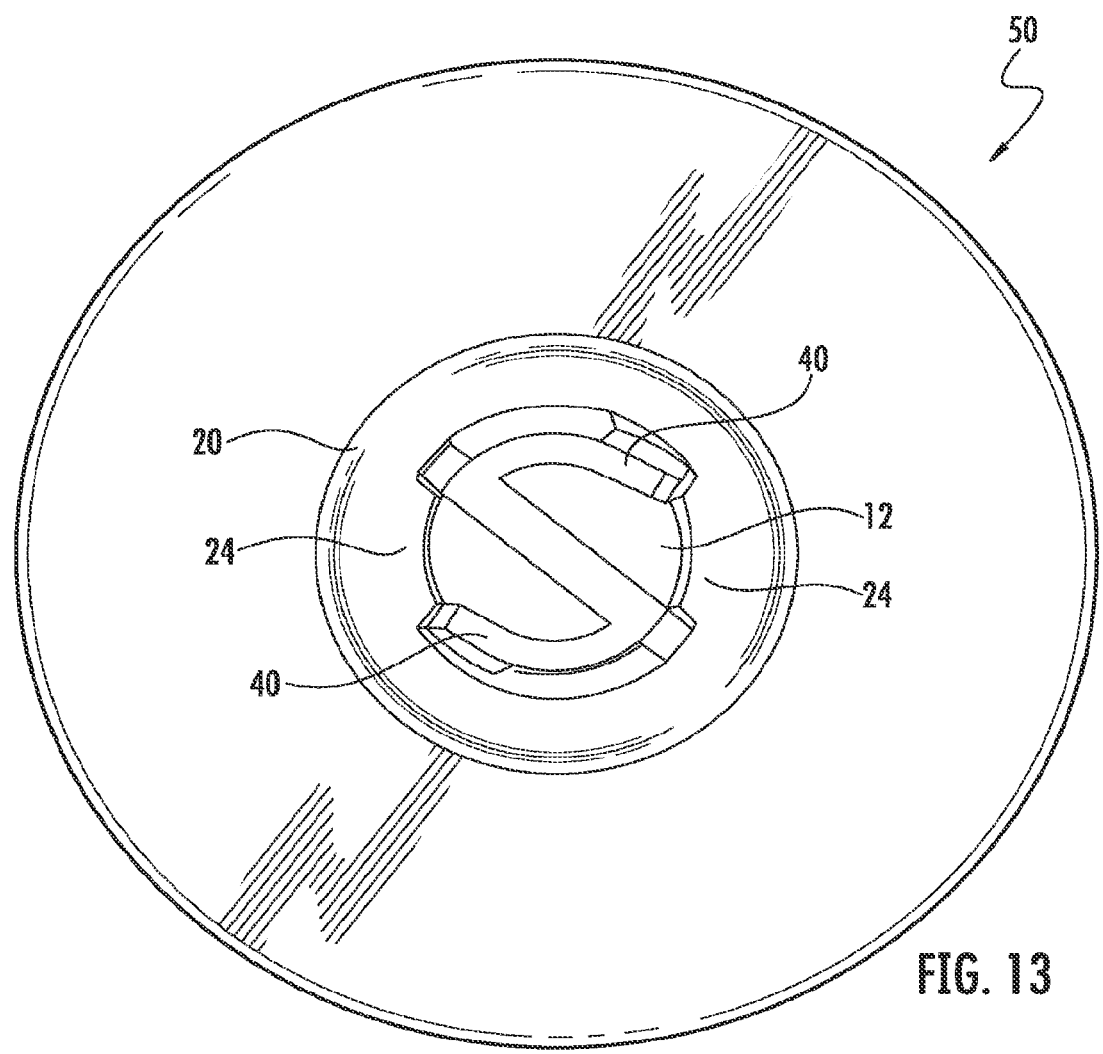
FIG. 13 is a bottom plan view of the fastening assembly of FIG. 11, showing the fastener turned in the second position.
Figure 16:
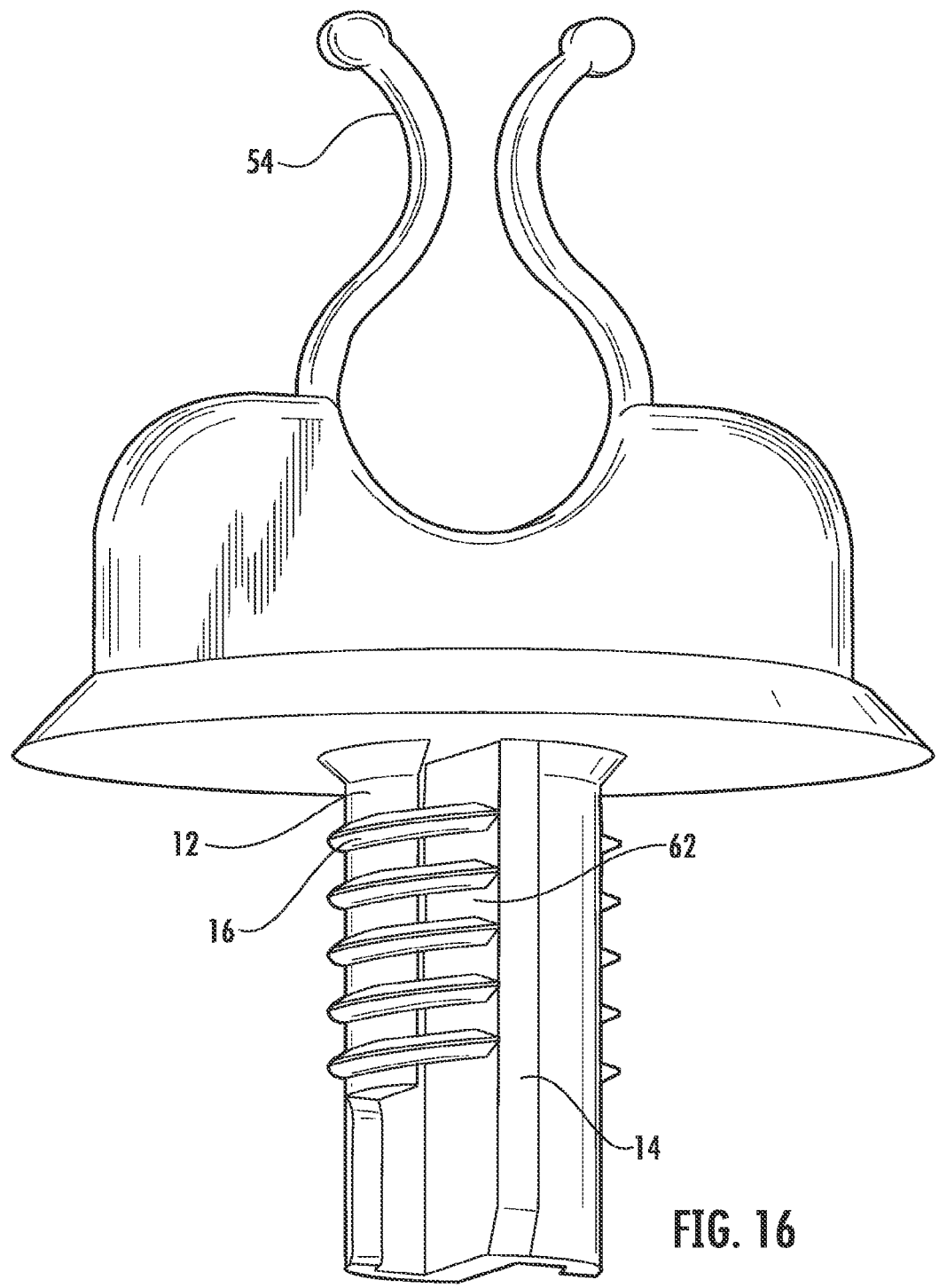
FIG. 16 is a perspective view of another embodiment of a fastener of the present invention incorporated into a wire guide and illustrating the use of alternate side coring as a simplified means of mold tool construction.
Figure 17:
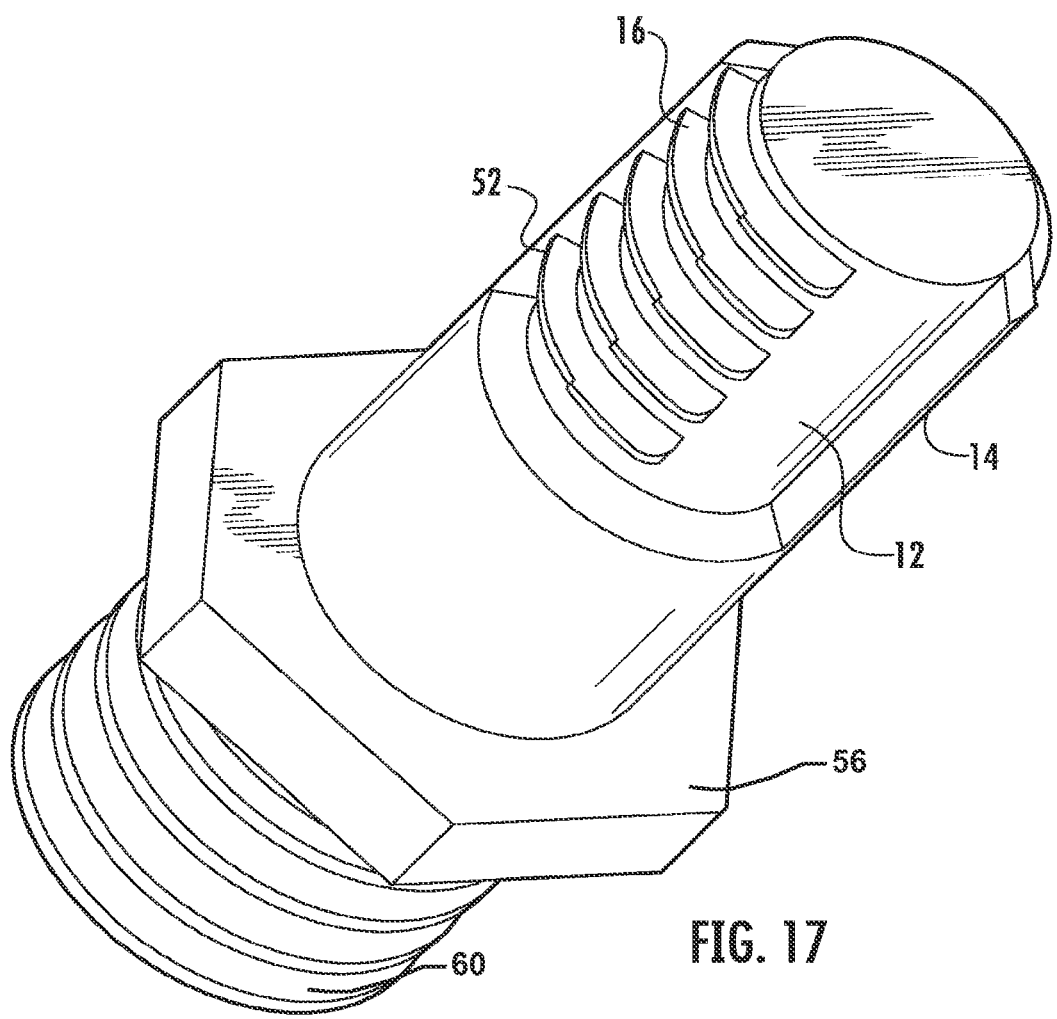
FIG. 17 is a perspective view of another embodiment of a fastener of the present invention, illustrating the use of non-helical threads and thread relief.

Referring now to the drawings, the fastening assembly 50 includes a fastener 10 that mates with a tubular boss 20. The fastener 10 includes a shaft 12 with at least one rib 14 along its length and at least one thread segment 16 extending around the shaft 12 from the rib 14. In the embodiments shown, the shaft 12 includes two ribs 14 and two thread segments 16 separated by channel openings 18, although other combinations and numbers of ribs, thread segments and channel openings could be used. The thread segments 16 can be formed in a helical pattern as shown in FIGS. 4, 8, 9 and 16 or a non-helical pattern as shown in FIG. 17. The shaft 12 is intended to be incorporated into a molded part such as the parts shown at least in FIGS. 16 and 17. For simplicity of illustration, FIGS. 4 and 8-9 show the shaft 12 molded along with a simple flange 28 and turning knob 30.

Figure 1:
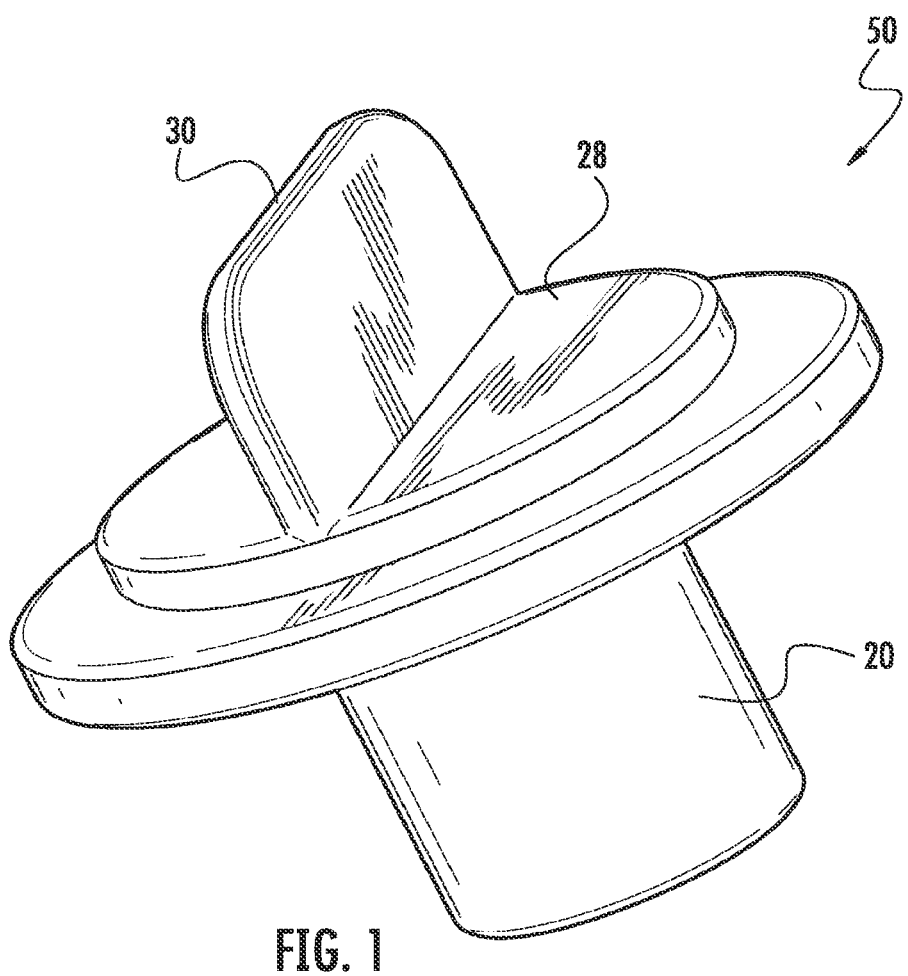
FIG. 1 is a perspective view of one embodiment of a fastening assembly of the present invention.
Figure 2:
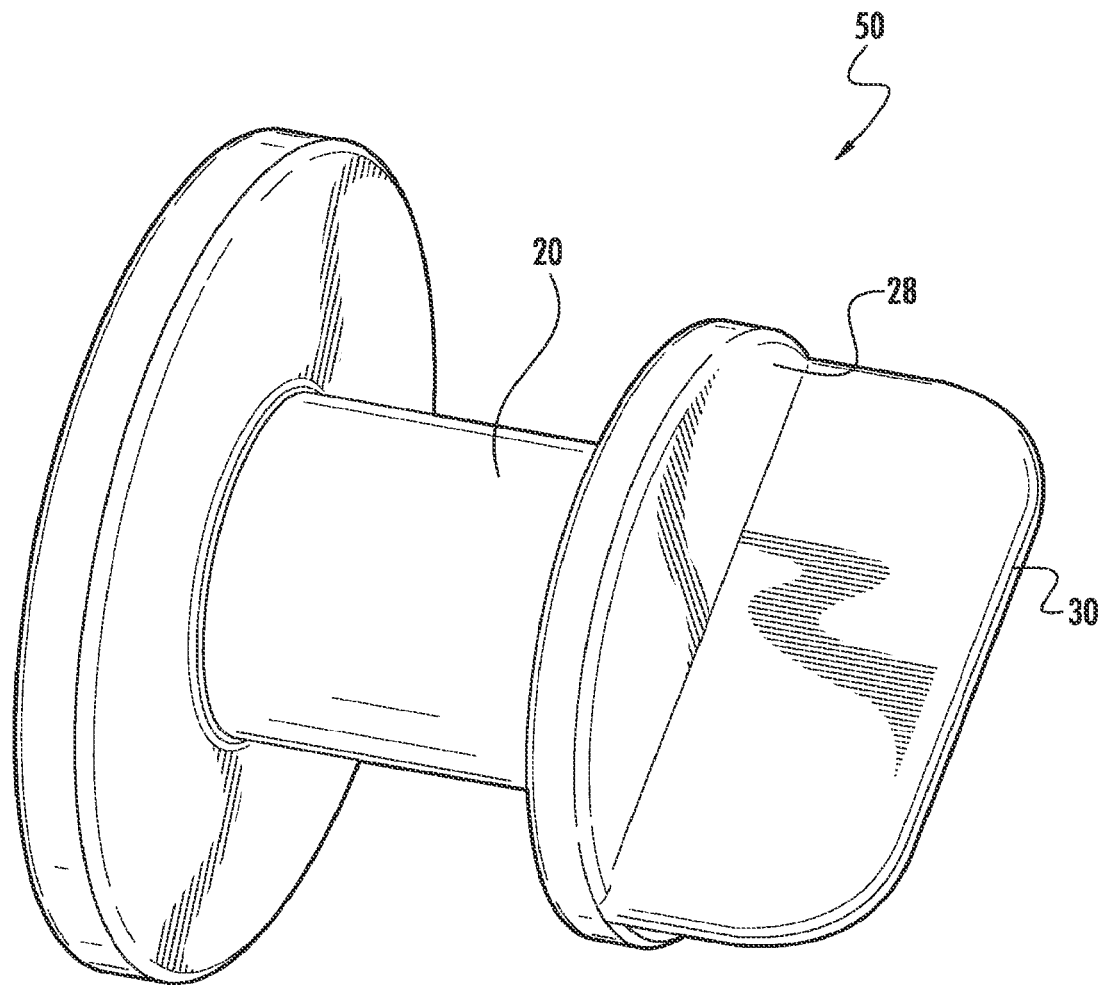
FIG. 2 is a perspective view of another embodiment of a fastening assembly of the present invention, showing the fastener turned in a first position.
Figure 3:
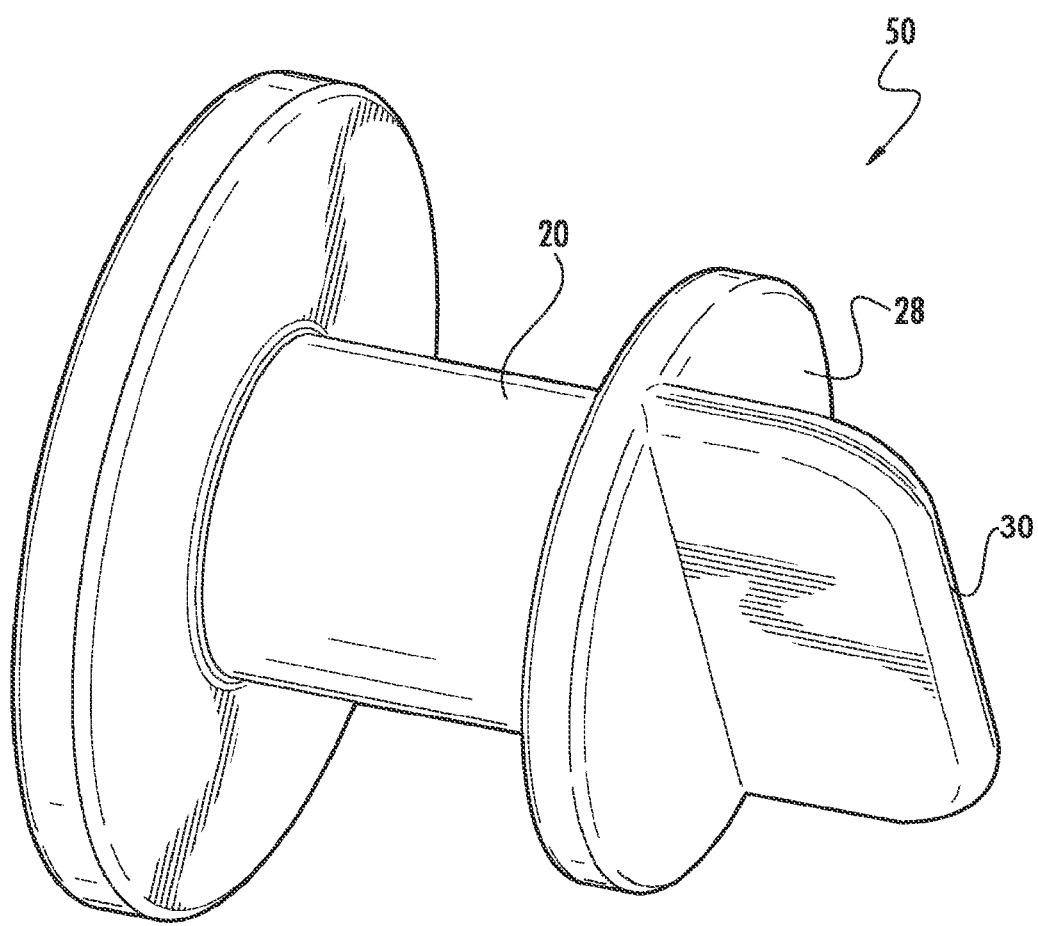
FIG. 3 is a perspective view of the fastening assembly of FIG. 2, showing the fastener turned in a second position.
Figure 15:
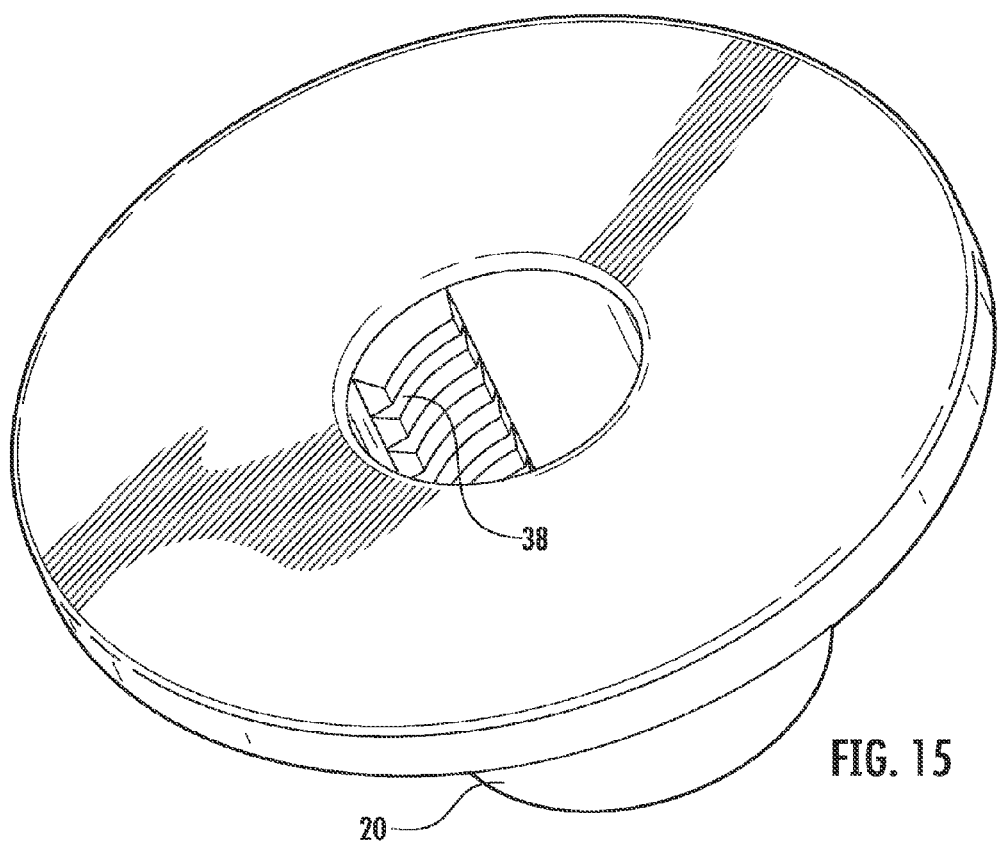
FIG. 15 is a perspective view of another embodiment of a tubular boss of the present invention, illustrating the use of internal threads.

One embodiment of the tubular boss 20 includes a cylindrical opening 22 and at least one column 24. The use of two columns 24 as shown in the drawings has been found quite effective for many applications. In another embodiment, the tubular boss 20 has internal thread segments 38 as shown in FIG. 15. The internal thread segments 38 can be formed using less expensive 'collapsing' core pins instead of unscrewing mechanisms. The boss 20 is preferably molded into the part onto which another part will be fastened, or vice versa. The cylindrical opening 22 of the boss 20 can be either a through hole or a blind hole, and the boss 20 can be either molded such that it extends into the part, as shown in FIG. 1 for example, or out of the part as shown in FIGS. 2 and 3.

Figure 14:
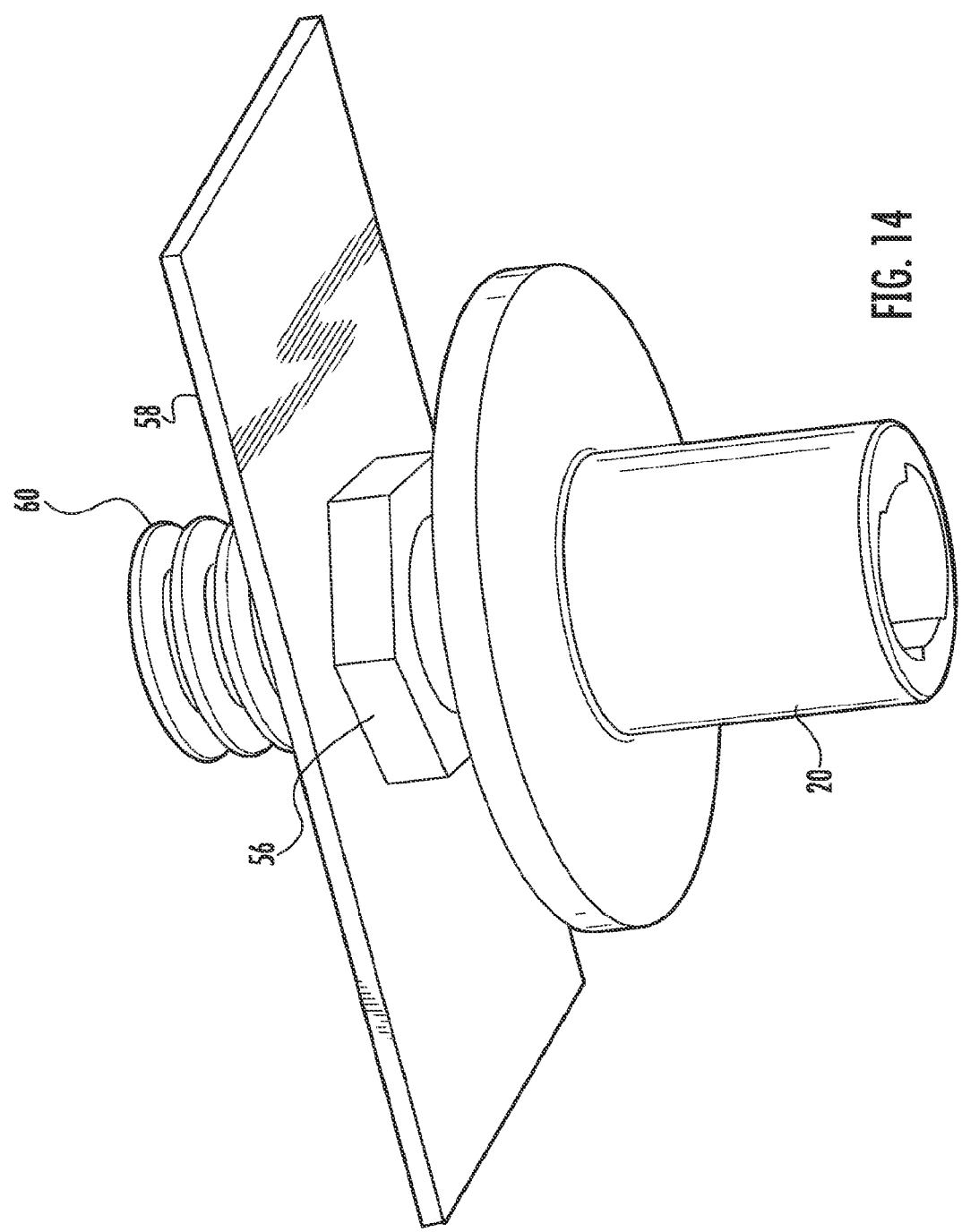
FIG. 14 is a perspective view of one embodiment of a fastening assembly of the present invention incorporated into a collar stud arrangement so that it may be used as an adjustable stand-off.

The shaft 12 is inserted into the cylindrical opening 22 of the boss 20 with the channel openings 18 aligned with the channels or columns 24. The shaft 12 is then rotated or turned inside the boss 20 such that the thread segments 16 engage the columns 24 on the inside of the boss 20. The use of a quarter turn to engage the shaft 12 to the boss 20 is particularly effective and advantageous for many applications. To facilitate engagement of the thread segments 16 with the columns 24, the thread segments 16 can be formed from a plastic material of higher strength than that of the plastic material used for the tubular boss 20. When a helical thread pattern is used, an additional clamping force is generated between the boss 20 and shaft 12, which is useful in many applications. The use of a non-helical thread pattern as shown in FIG. 17 creates the option of first positioning the shaft 12 into the tubular boss 20 at a desired depth, which may be at any point along the length of the shaft 12, and then rotating to the locking position. This would create an adjustable stand-off, as shown in FIG. 14, which is in itself a desirable feature in some designs.

Figure 7:
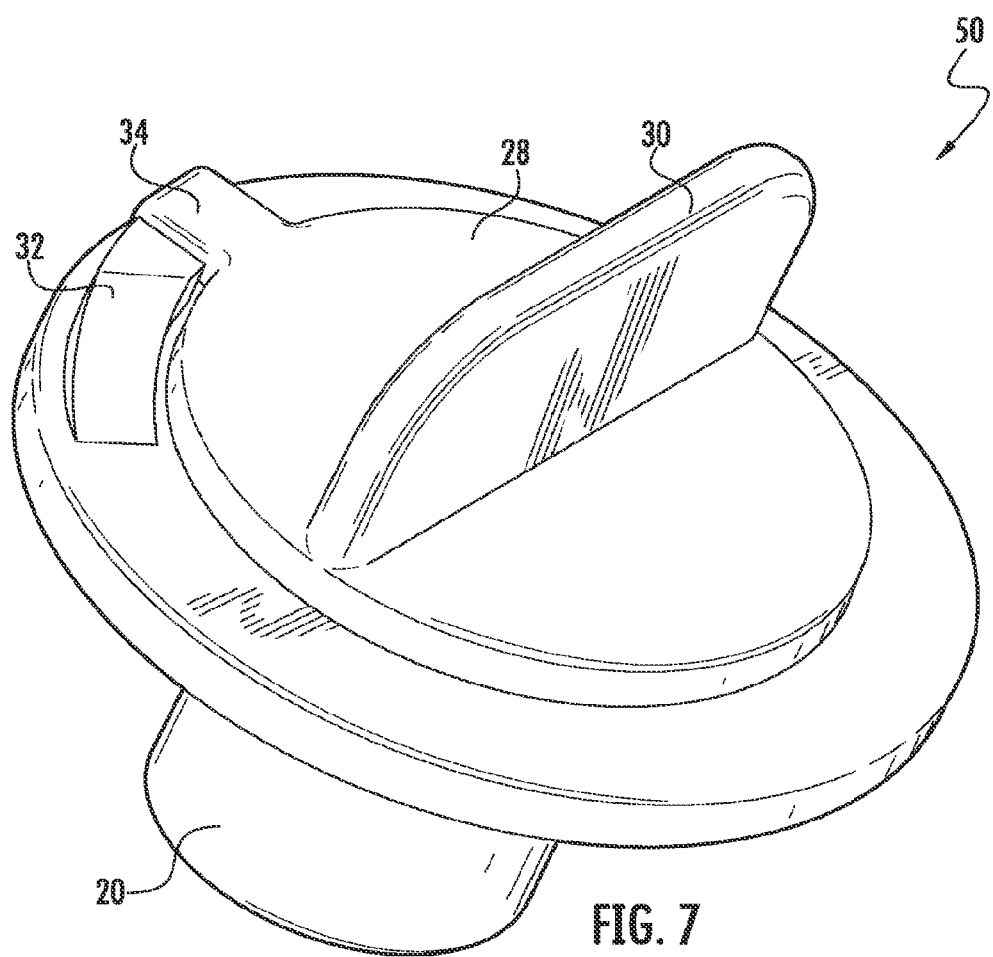
FIG. 7 is a perspective view of another embodiment of a fastening assembly according to the present invention, showing one embodiment of a locking feature.

A variety of locking features can be used in connection with the fastener 10 of the present invention. FIG. 7 shows one example of a locking feature, wherein the flange 28 of the shaft 12 includes a tab 34 that interacts with a ramp 32 on the boss 20. The tab 34 can easily pass over the ramp 32 as the knob 30 is turned clockwise to engage the shaft 12 to the boss, but the tab 34 cannot pass back over the ramp 32 if the knob 30 is turned in the counter-clockwise direction. Another locking feature is shown in FIGS. 8, 9, 12 and 13 as an "S" shaped flex tab 40. Once the shaft 12 is rotated a full quarter turn, the flex tab 40 seats in between the columns 24 and prevents counter-rotation of the shaft 12. A thread relief 52 as shown in FIG. 17 can also be used as a mild locking feature.

The shaft 12 of the fastener 10 can be incorporated into a variety of molded parts to facilitate attachment to other parts. For example, FIG. 17 shows a shaft 12 of the present invention incorporated into a collar stud arrangement with a hex collar 56, panel 58 as seen in FIG. 14, and thread 60 for use as an adjustable stand-off and FIG. 16 shows a shaft 12 of the present invention incorporated into a wire guide 54. The shaft 12 of the present invention can also be used in connection with a vehicle lamp assembly fastener, where a shaft 12 of the present invention is molded into the stud of the lamp assembly fastener and a tubular boss 20 is molded into the lamp assembly. These examples are a few of many possible applications for the fastener of the present invention.

Many different materials can be used for the various components of the present invention, including metals, composites and plastics. It has been found cost effective to manufacture the majority of the components out of injection-molded plastic or plastic composite materials. When using an injection molding process, certain parts can be molded using a simplified mold tool design, wherein all part features are formed without the need for core pins. For example, a fastener made via the use of alternate side coring 62 as a simplified means of mold tool construction is shown in FIG. 16.

The fastening assembly can also be easily altered to accommodate various design and molding requirements that are difficult to meet using conventional threaded fasteners. The fastener 10 and tubular boss 20 could be significantly tapered or "drafted" by, for example, five degrees or more, if this becomes advantageous for design or molding reasons. Conventional threads can only have a very mild taper, so are very limited in that regard. The pitch between the threads of the fastener 10 of the present invention can be large for deep engagement, but the helix or thread slope can be mild for optimum vibration resistance, whereas conventional threads must tradeoff between the two features.

The fastener of the present invention may have other applications aside from those specifically described herein. The fastener has applications in a number of different industries and would be useful in all applications where attachment to a tubular boss is desirable. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A fastener assembly comprising:
  a shaft having at least one rib along its length and at least one thread segment extending at least partially around the shaft from the at least one rib;
  a plurality of thread forming threads extending from the at least one thread segment;
  a tubular boss having a cylindrical opening with at least one column without threads disposed therein;
  wherein the shaft is inserted into the tubular boss in a first position such that the column is not engaged by threads and rotated into a second position such that the at least one thread segment engages the at least one column via some of the plurality of thread forming threads to form threads in the column;
  wherein the shaft is rotated in a first direction when the shaft is rotated from the first position into the second position; and
  wherein when the shaft is in in the second position, the at least one rib contacts the at least one column to prevent the shaft from being further rotated in a first direction.

* * * * *